United States Patent [19]

Vaders

[11] 4,417,758
[45] Nov. 29, 1983

[54] REMOTELY RELEASABLE CHOKER

[75] Inventor: Dennis H. Vaders, Puyallup, Wash.

[73] Assignee: Weyerhaeuser Company, Tacoma, Wash.

[21] Appl. No.: 327,003

[22] Filed: Dec. 3, 1981

[51] Int. Cl.³ .............................................. B66C 1/38
[52] U.S. Cl. .................................. 294/78 R; 294/75; 294/83 R
[58] Field of Search .................................. 294/74–76, 294/78 R, 83 R, 83 A, 83 AB, 84; 24/241 P, 241 PP, 241 PS, 241 SL, 241 SP

[56] References Cited

U.S. PATENT DOCUMENTS

| | | | |
|---|---|---|---|
| 967,141 | 8/1910 | Merriman | 24/241 PS |
| 1,963,634 | 6/1934 | Stahl et al. | 294/75 |
| 3,104,909 | 9/1963 | Walker | 294/75 |
| 3,134,154 | 5/1964 | Smith et al. | 294/83 R X |
| 3,239,266 | 3/1966 | Elliott | 294/75 X |
| 4,358,144 | 11/1982 | Schmidt et al. | 294/75 |

*Primary Examiner*—Johnny D. Cherry

[57] ABSTRACT

In logging and other handling operations, a cable is often looped about the elongated object and cinched tight through a choker hook assembly in order to transport the objects. A remotely controlled hook assembly has a body, including an eye for the passage of the cable and a releasable latch arm for grasping the end of the cable. Encased within the body is a slidable pin that serves to lock the latch arm and therefore the end of the cable. A positioning device is also within the housing and serves to rotate a catch member allowing the slidable pin to move downwardly, thereby releasing the latch arm and cable. A pair of appropriately sized and located springs serve to both move the sliding pin downwardly and to bias the pin upwardly. A radio controlled servo may be used as the positioning device.

7 Claims, 7 Drawing Figures

U.S. Patent    Nov. 29, 1983    Sheet 1 of 3    4,417,758
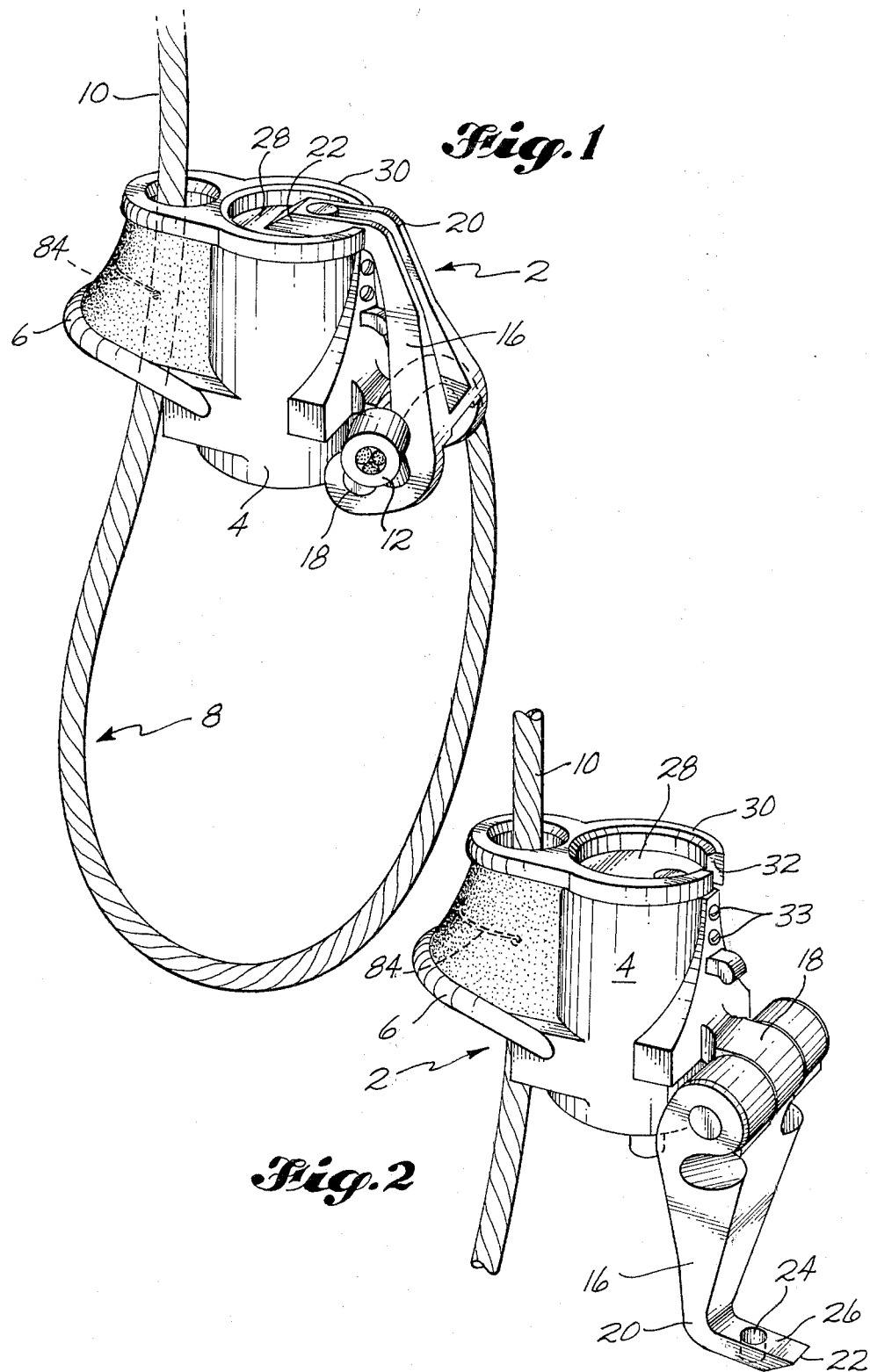

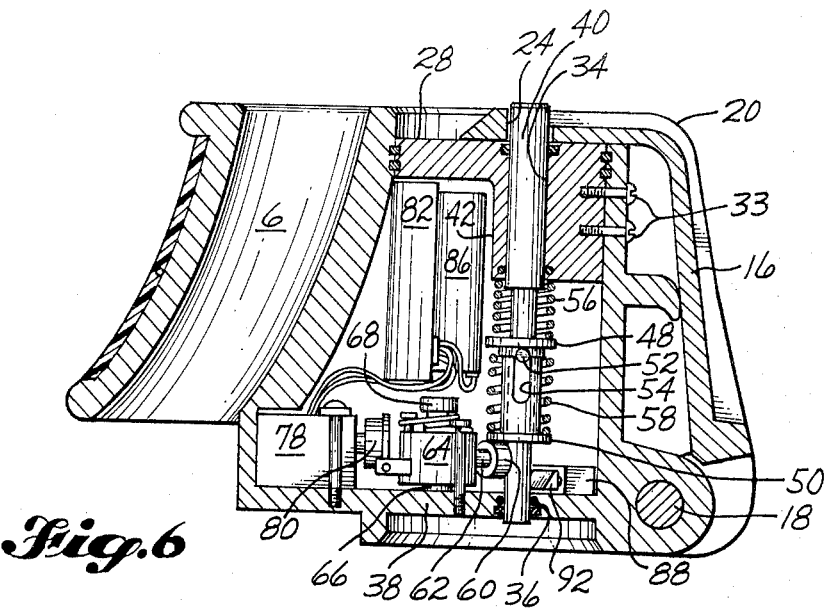
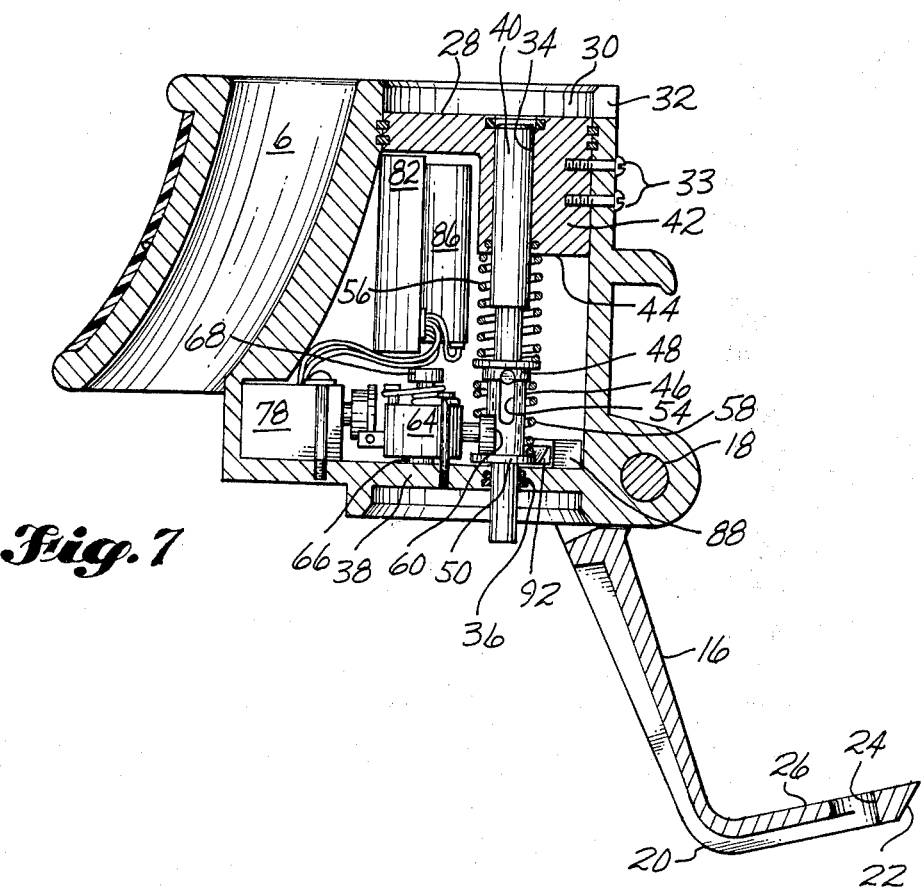

REMOTELY RELEASABLE CHOKER

BACKGROUND OF THE INVENTION

This invention relates generally to log handling systems for use in the woods or other elongated object handling systems, but more particularly to a remotely controlled choker hook and release system.

It is common practice in woods operations where trees are being harvested and logs moved about to utilize cable handling systems either at ground level or overhead yarding systems. As a part of these log handling systems, steel cables are wrapped about felled trees to form a noose or choker. The cable, once looped around a tree or a plurality of trees, is attached back onto itself, using a special device referred to as a choker hook which allows the loop to tighten about the tree. The tightened loop serves to hold it as the cable is then tensioned to lift the tree and pull it to the desired location. Once the logs arrive at the desired location, the choker must then be released in order to release the tree. The typical way choker hooks are now released is by manual labor, physically releasing the choker hook after the cable is slackened and the loop removed from the tree. Not only is the job of releasing the chokers extremely dangerous, but it takes time and delays production.

In the past, others have designed remotely controlled selfreleasing choker mechanisms and one such example may be seen by referring to U.S. Pat. No. 3,104,909 issued in 1963 to W. M. Walker. In the Walker patent, a choker hook is disclosed where the end of a cable has a ferrule affixed to it which is seated and held within the choker hook casing. A pivotally mounted locking arm is controlled in part by a servo for holding and releasing the end of the cable. There are certain shortcomings in the Walker choker hook, among them being its lack of flexibility, openness, complexity, size and cost. These disadvantages have been overcome by the subject matter of the present invention.

Accordingly from the foregoing, one object of the present invention is the provision of a small, highly reliable self-contained remotely controlled choker hook mechanism.

Another object of the invention is to provide a self-releasing choker hook capable of grasping and releasing cables with either loops or ferrules on their ends.

Yet a further object of this invention is to provide a mechanism which can be manufactured and operated at a low cost.

These and other objects of the invention will be better understood and appreciated upon a thorough review of the specification to follow in conjunction with the attached drawings.

BRIEF SUMMARY OF THE INVENTION

Briefly, this invention is practiced in one form by a choker hook which is self-contained in a housing or body having means on one side for allowing a cable to slide therethrough and having on another side external to the choker housing a pivotally releasable latch arm for securing and releasing the end of a cable grasped by the choker hook. Within the choker housing and well protected is a slidably mounted pin extending through the housing and upwardly so as to engage an aperture in the latch arm for locking purposes. An internal release mechanism has means associated therewith for causing the slidable pin to move downwardly out of the aperture, thereby releasing it and the end of the cable. The release means may include a servo or solenoid activated rotating catch which either supports the pin in its upward position or rotates to remove the support, thereby allowing the pin to retract. A radio receiver, battery pack, and servo are all packaged within the housing. A switch is located in the housing adjacent to the slidable pin and when the latch arm is to be closed and locked in position, the pin is moved upwardly closing the switch, thereby signalling the drive means for the catch to move and position the support means to a position under a shoulder on the slidable pin. The slidable pin can be structured so as to be spring loaded to allow the upper end of the latch arm to ride over it, thereby allowing the slidable pin to engage the aperture in the latch arm.

BRIEF DESCRIPTION OF THE DRAWINGS

FIG. 1 is an isometric view showing the choker hook structured according to the present invention having a cable extending therethrough and the cable end with a ferrule locked in place.

FIG. 2 is a view similar to FIG. 1 but shows the latch arm in its open position having released the end of the cable.

FIG. 6 is a vertical section view taken through the choker hook assembly showing the slidable pin extended thereby locking the latch arm in position.

FIG. 7 is a view similar to FIG. 6 showing the slidable pin in its retracted position and the latch arm thereby released.

DETAILED DESCRIPTION OF THE PREFERRED EMBODIMENT

Figure 3:
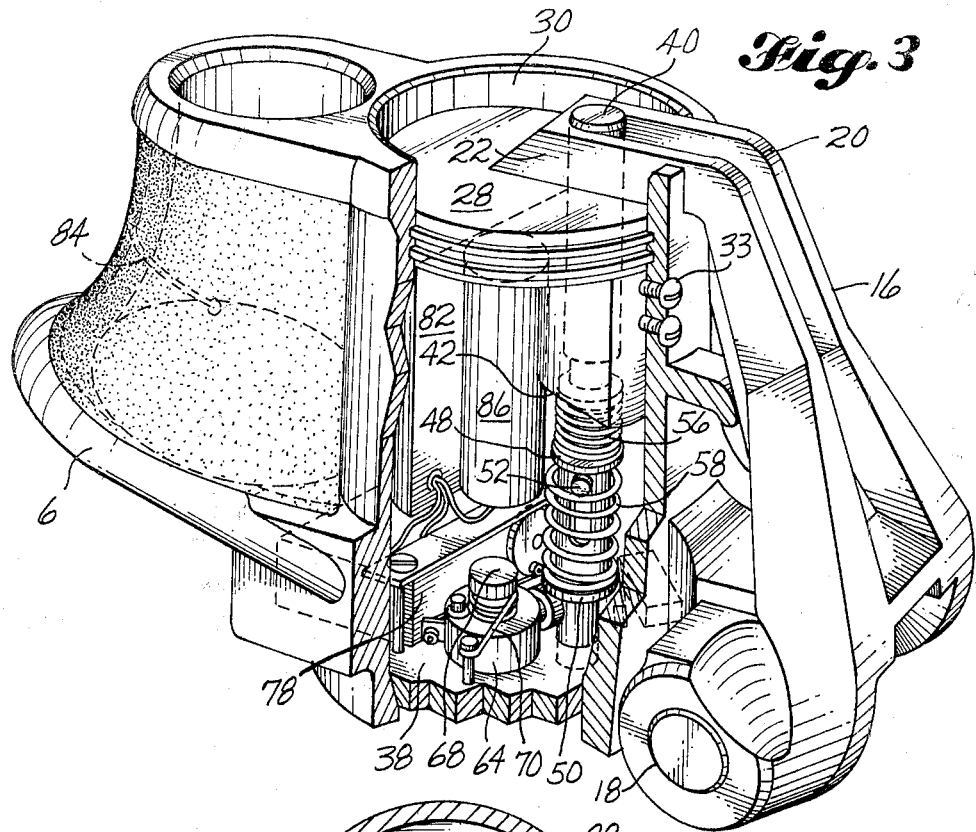
FIG. 3 is a cutaway perspective view showing the internal details of the choker hook assembly with the latch arm in its locked position
Figure 4:
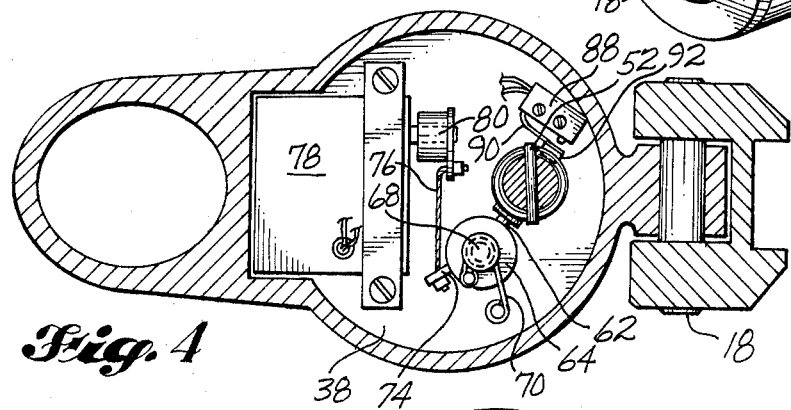
FIG. 4 is a horizontal section view through the choker hook showing the relative locations of the elements within the housing.
Figure 5:
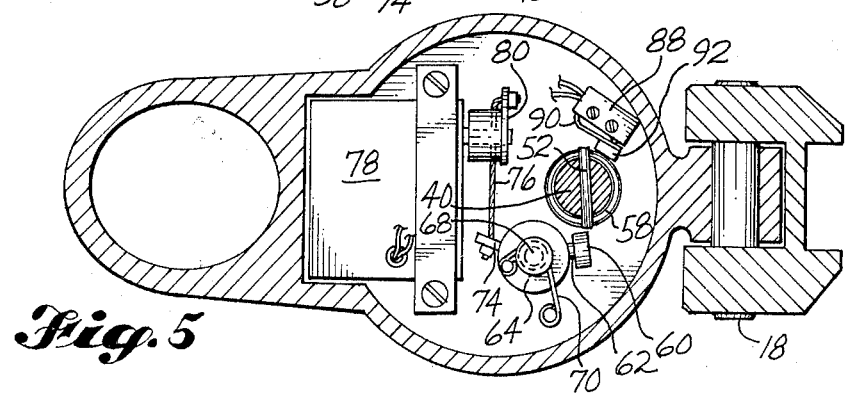
FIG. 5 is a view similar to FIG. 4 showing the rotatable catch in its retracted position.

Referring first to FIGS. 1 and 2, the choker hook is indicated at 2 and includes a generally cylindrical housing or body 4. On one side of housing 4 is an eye means 6 which provides part of the means for forming the choker loop indicated at 8 in the cable 10. At the end of cable 10 in the embodiment depicted is a ferrule 12. While a ferrule 12 is depicted, other means may be attached to the end of cable 10 such as a loop. Such cables and their end attachments are well known and need not be described in any greater detail. Further, as will be well understood by those skilled in the art, it is loop 8, which when formed by the cable and choker hook 2, that will be positioned about a log, grouping of logs, or other elongated objects and then cinched tight for handling purposes. As tension is applied to cable 10, the loop is closed tight about the object, thereby allowing it to be moved to a desired location.

On another side of housing 4 is the pivotally mounted latch arm 16. Latch arm 16 may be substantially U-shaped and is attached to body 4 at pivotal means 18. The arm 16 extends upwardly and has a bend 20 terminating at its upper end 22. Between bend 20 and upper end 22 is an aperture 24 extending through arm 16. Aperture 24 can be of any suitable cross-sectional shape although in the embodiment depicted it is substantially circular. The bottom surface 26 of upper end 22 is structured and sized so as to lie substantially parallel to the top covering element 28 of cylindrical body 4. Covering element 28 is positioned a small distance downwardly from the top edge of body 4, thereby developing a rim 30 on the top of the choker hook 2. In order to accommodate the upper end 22 of latch arm 16, an opening 32 is located in rim 30, with the opening being slightly larger in its width dimension than the width of upper end 22, allowing the latch arm to fit in the opening. This relationship may be clearly seen by referring to FIGS. 1, 3 and 6.

Latch arm 16 and its pivotal means 18 are constructed so as to be strong and for an even distribution of stresses. When latch arm 16 is locked in position and the choker hook 2 is under stress, a significant amount of force will be applied downwardly in the area about pivotal means 18; therefore, it must be constructed of high strength materials and also with a sufficient amount of material.

Turning now to FIGS. 3-7, a detailed description of the internal latching and control mechanism will be rendered. It is important to note at this point that latch arm release and control means must be well protected within a secure environment and must be durable for long life in the harsh environment of logging operations or other heavy duty use. As previously noted, the cylindrical body 4 is constructed of high strength material and can conveniently be cast to the desired shape. For access to the inside of body 4, top covering element 28 is a separate piece attached by screws 33 which can be removed from body 4. Mounted within body 4 and slidable within aperture 34 in covering element 28 and aperture 36 within the bottom covering element 38 is the latch pin 40. Depending downwardly from covering element 28 and integral therewith is bearing lug 42 having a bottom surface 44. Lug 42 extends approximately one-third to one-half the distance between top covering element 28 and bottom covering element 38. The upper end of pin 40 is structured so as to fit within aperture 24 when it is in registry with top aperture 34. Both ends of pin 40 are rounded. Further, the length of pin 40 is sized so its overall length will be approximately equal to the distance from the bottom surface of bottom covering element 38 and the uppermost surface on the upper end 22 on latch arm 16 when it is in its locked position.

Positioned about latch pin 40 and slidable relative to it is the sliding collar body 46. As may be clearly seen in the Figures, collar 46 is located on the bottom half of pin 40 and further has a pair of vertically spaced circumferential shoulders, the top one being indicated at 48 and the bottom one being indicated at 50. Limiting the vertical movement of collar 46 is the through pin 52 fixed to the latch pin 40 and extending through the pin slot 54 on either side of collar body 46. The length of slots 54 corresponds to the length of pin 40 that extends upwardly through aperture 24 when the latch arm is locked in place. Serving to provide in part the various movements for pin 40 is a pair of compressible coil springs with one indicated at 56 being mounted about pin 40 and extending between the top circumferential edge of shoulder 48 and the bottom of surface 44. The other spring 58 is mounted about collar 46 and extends between the lower circumferential edge of bottom shoulder 50 and the bottom edge of through pin 52. Functionally, upper spring 56 provides the downward movement for latch pin 40 when the latch arm 16 is to be released. Lower spring 58 provides an upward biasing force so that when pin 40 is up and latch arm 16 is closed pin 40 can be biased downwardly.

Serving to hold pin 40 in its upwardly extended position, thereby holding latch arm 16 in its closed relationship, and to release it is a roller bearing 60 which is movable in a horizontal plane with respect to pin 40 from a first position out of engagement with bottom shoulder 50 to a second position engaging the bottom surface of shoulder 50, thereby holding shoulder 50 in place along with collar 46 and pin 40. Bearing 60 is mounted on a support arm 62, which in turn is fixedly attached to a rotatable catch member 64. Rotatable member 64 is mounted on bottom covering element 38 by a downwardly extending shoulder screw 66. On the top of screw 66 is a head 68 which retains a torsion spring 70, one end of which is fixed to the top of rotatable member 64, while the other end is held fixed relative to the body 4, either by being pinned or by abutting the inside surface of body 4. Torsion spring 70 serves to aid in moving the rotatable member 64 and, therefore, the roller bearing 60. Extending outwardly from the side of rotatable member 64 approximately opposite arm 62 is a second arm 74 which serves to provide the attachment means for the servo drive cable 76. A servo mechanism indicated at 78 is substantially a commercially available servo and is capable of being activated by appropriately generated signals to rotate arm 80, thereby moving drive cable 76 linearly. Suitable servo mechanisms are in common use by radio controlled model enthusiasts. A radio receiver indicated at 82 is mounted above servo mechanism 78 and rotatable member 64 and to one side of the latch pin 40. Again, radio receiver 82 is one which is commercially available and functionally is equipped to receive remotely generated radio signals and develop suitable signals for controlling servo mechanism 78. An antenna 84 is mounted in a rugged polymer covering around eye 6. Any suitable antenna means may be utilized, provided it has the capability of receiving the radio signal without being damaged when the choker hook is used. The power supply for operating choker hook 2 is provided by a battery 86 also mounted above rotatable member 64 and to the side of pin 40. Typically, a nickle-cadmium battery will be used due to their rechargeable characteristic and durability. A small switch 88 is mounted on the floor of bottom covering element 38 just to one side of the slidable latch pin 40. A spring arm 90 extends outwardly from switch 88 and has a cam 92 mounted on the end which serves to open and close the switch as the bottom shoulder 50 moves up and down. As depicted in FIG. 7 when shoulder 50 is in its lowermost position, the cam 92 has moved inwardly opening the circuit. When shoulder 50 moves upwardly, the switch closes.

OPERATION OF THE CHOKER HOOK ASSEMBLY

For use in the woods, the choker loop 8 will first be formed and the loop placed about a log. In FIGS. 1 and 3, the latch pin 40 is shown as being in its upwardly extended position. Once the cable 10 is looped about a log and ferrule 18 positioned between body 4 and latch arm 16, the arm is ready to be closed and locked in position. The operator then moves latch arm 16 upwardly and over the biased pin 40. The cable 10 is then tensioned and the loop 8 cinched tight. The log or logs can then be moved to wherever the desired location is. Upon arrival, a transmitter means is used which is set at the right frequency compatable with radio receiver 82 to activate the servo mechanism 78. When logs are in place, the release signal is sent causing drive cable 76 to rotate catch member 64, thereby moving roller bearing 60 away from its supporting relationship with bottom shoulder 50. Once the support is gone and assuming the frictional resistance between pin 40 and the surface of aperture 24 is overcome, upper spring 56 will force the top shoulder 48 down against through pin 52, thereby causing pin 40 to move downwardly. As it reaches the plane of the top surface of covering element 28, latch arm 16 will then be released. Once latch arm 16 is released, the logs will fall free and the cable and choker hook assembly can be retrieved for subsequent use. It order to reset the choker hook for subsequent use, an operator simply pushes up on the bottom of pin 40, thereby closing switch 88 causing servo mechanism 78 and torsion spring 70 to rotate member 64 moving the roller bearing 60 to its position under bottom shoulder 50, thereby holding pin 40 in its upper extended position.

Having described the choker hook assembly in detail and its typical operating procedure, it will occur to others skilled in the art that certain modifications and changes to the invention can be made. All such changes and modifications are intended to be included within the scope of the appended claims.

I claim:

1. A choker assembly, comprising:
   a substantially closed body,
   eye means on the body for allowing a cable to slide therethrough,
   a pivotally mounted latch arm on the outside of the body having an open position and a locked position where the locked position will capture and hold the end of a cable,
   means on and extending within the body for locking the latch arm in its locked position, and
   means within the body for releasing the locking means including a receiving means for receiving a remotely generated wave form release signal and actuating means for removing the locking means engaged with the latch arm in response to the release signal.

2. A choker hook assembly as in claim 1 in which the locking means includes a portion of a slideable pin in the body and corresponding aperture in the end of the latch arm.

3. A choker hook assembly as in claim 2 in which a portion of the slideable pin engages the aperture in the latch arm when in its upwardly extended position.

4. A choker hook assembly as in claim 2 in which the pin is spring biased when in its upwardly extended position.

5. A choker hook assembly as in claim 2 in which a collar extends about the pin and has at least one shoulder thereon for engagement with a supporting means to hold the pin in its upwardly extended position.

6. A choker hook assembly as in claim 5 in which the locking means includes a rotatable catch holding the supporting means.

7. A choker hook assembly as in claim 6 in which the actuating means rotates the catch to move the supporting means into and out of engagement with the shoulder.

* * * * *